Figure 1:
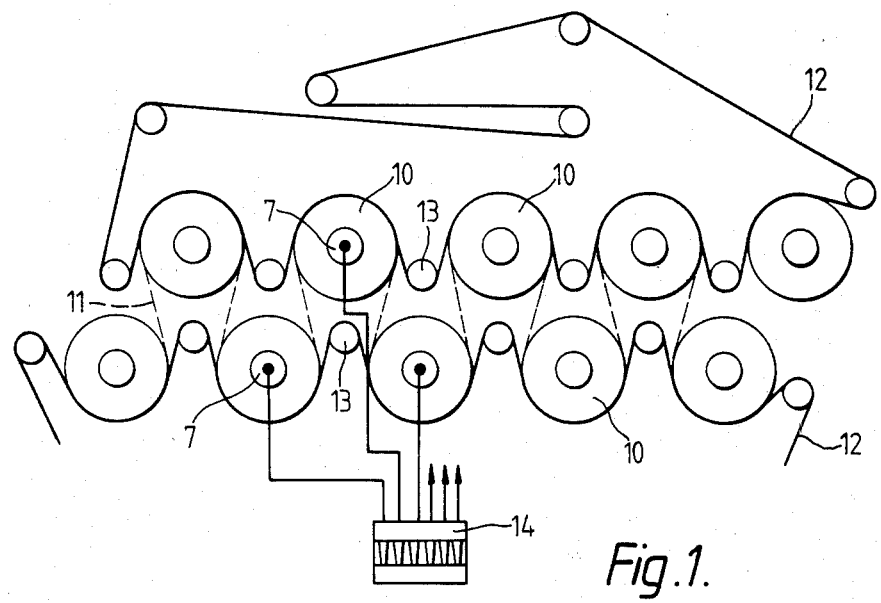

United States Patent [19]

Horttonen

[11] Patent Number: 4,519,247

[45] Date of Patent: May 28, 1985

[54] PROCEDURE FOR LUBRICATING THE BEARINGS IN EQUIPMENT COMPRISING A PLURALITY OF OIL-LUBRICATED BEARINGS

[75] Inventor: Kalevi Horttonen, Nurmijärvi, Finland

[73] Assignee: O. Kytölä ja Kumpp. Kommandiittiyhtiö, Muurame, Finland

[21] Appl. No.: 515,035

[22] Filed: Jul. 18, 1983

[30] Foreign Application Priority Data

Jul. 28, 1982 [FI] Finland ............................ 822642

[51] Int. Cl.³ ........................................ G01F 15/18
[52] U.S. Cl. ................................ 73/198; 73/195; 184/7.4
[58] Field of Search ............... 73/195, 198, 432 AD; 384/399; 137/883; 184/6.4, 7.4

[56] References Cited

U.S. PATENT DOCUMENTS

| | | | |
|---|---|---|---|
| 1,793,007 | 2/1931 | Pearson | 73/198 X |
| 2,671,211 | 3/1954 | Black et al. | 73/272 A X |
| 3,180,661 | 4/1965 | Porath | 384/398 X |
| 4,364,452 | 12/1982 | Crago | 184/7.4 |

Primary Examiner—Charles A. Ruehl
Attorney, Agent, or Firm—Burns, Doane, Swecker & Mathis

[57] ABSTRACT

A procedure and means for lubricating the bearings in equipment comprising a plurality of oil-lubricated bearings (7). The oil is conducted to each bearing separately through a volumetric meter (4) which meters the oil quantity going to the bearing. The oil is conducted to a unit (14) comprising a plurality of volumetric meters (4), where it is distributed through a branching tube (2-3) comprised in the unit to each meter. A signal proportional to the flow passing through each meter can be conducted electrically further to a monitoring point.

2 Claims, 6 Drawing Figures

PROCEDURE FOR LUBRICATING THE BEARINGS IN EQUIPMENT COMPRISING A PLURALITY OF OIL-LUBRICATED BEARINGS

The present invention concerns a procedure for lubricating the bearings in equipment comprising a plurality of oil-lubricated bearings so that the oil is separately conducted to each bearing through a volumetric meter measuring the oil quantity that goes to the bearing, the result of measurement being utilized in controlling the oil quantity. The invention also concerns a means for applying the procedure.

A paper machine has usually about 600–700 oil-lubricated bearings. The oil also takes care of cooling the bearings, on the side of lubrication. It is important from the viewpoint of cooling that the correct oil quantity is conducted to each bearing in the circuit. For each bearing a meter has to be provided which measures the quantity of oil going to that bearing. In earlier practice, the meters used to be disposed at the place which is most favourable for reading them, that is in the ground-floor storey of the machine. However, the majority of the bearings are located in the top storey of the machine, and therefore the oil has been conducted by the aid of separate pipes from each meter to the respective bearing. Consequently, a very great amount of tubing made of acid-proof steel is required, and this involves very high costs.

The procedure of the present invention for lubricating bearings is characterized in that the oil is conducted to a unit comprising a plurality of volumetric meters, where it is distributed through a branching tube contained in the unit, to each meter, and that a signal proportional to the flow passing through each meter is carried further, e.g. electrically, to a control point, the location of this monitoring point being independent of the meter locations. The means of the invention is characterized in that two or more volumetric meters have been disposed together with a branching tube in conjunction with one frame unit, preferably within this frame unit.

The invention enables the meter to be placed advantageously regarding the piping, whereby major savings in the costs accruing from the piping become possible. Assuming that in the case of each bearing 5 meters of piping can be saved, which in 1982 implied a price of about eight dollars per meter, installed ready for use, the compound savings achieved when there are 700 bearings are found to be about twenty-eight thousand dollars.

Since the number of tubes can be substantially reduced, it becomes possible to make the pipe system ready at the works and to install it by elements as the machine is being erected. This too entails considerable savings compared with present practice, in which the pipe system is only set up on the site.

According to the invention it is possible fo instance to transfer the result of measurement in the form of an electric signal to a site which is convenient from the viewpoint of monitoring, or supervision. This supervision may then be performed in the control room or control centre of the machine. It is possible in the supervision to utilize a microprocessor-based data collection system, and the control of the oil quantity going to the bearings may be automated, using given alarm limits. This implies remarkable savings in the machine's maintenance costs because the present system requires one person who makes continuous rounds of the machine, reading meters.

Savings are also achieved in the pipe system maintenance costs. In problem solutions of prior art, soiling of the long pipe systems involved a considerable need of cleaning.

The invention and its details are more closely described in the following with reference being made to the attached drawings, wherein FIG. 1 presents schematically a means according to the invention, installed in conjunction with the multiple cylinder drier of a paper machine.

Figure 2:
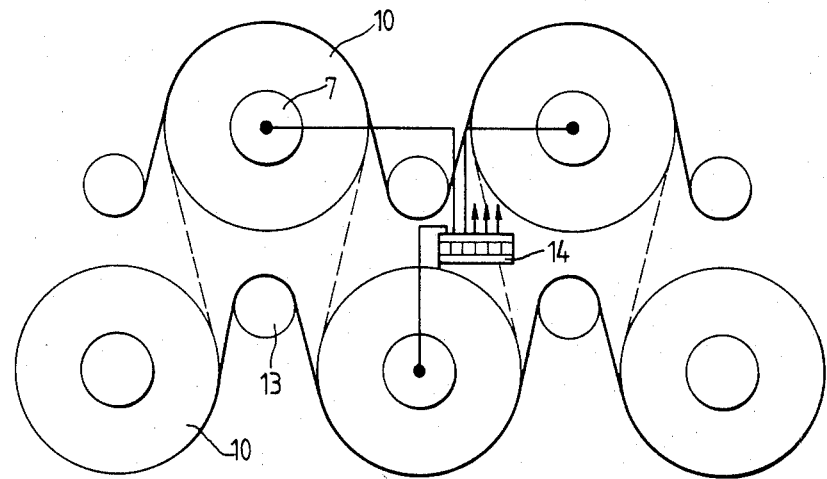
Figure 3:
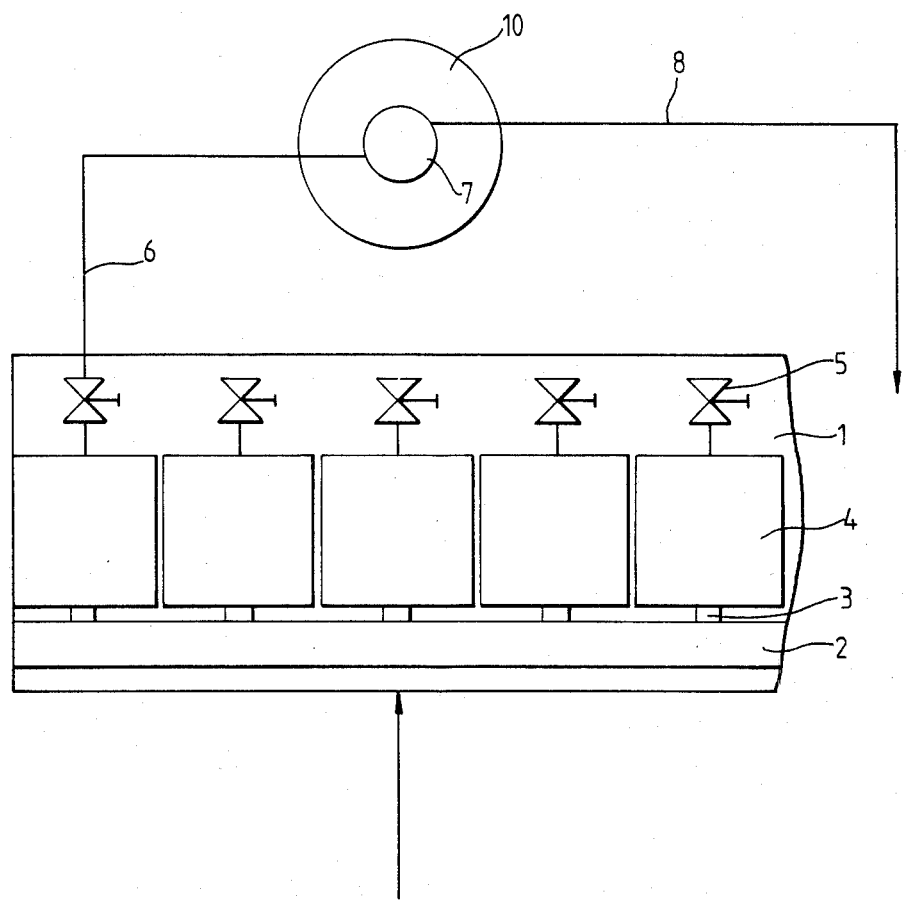
Figure 4:
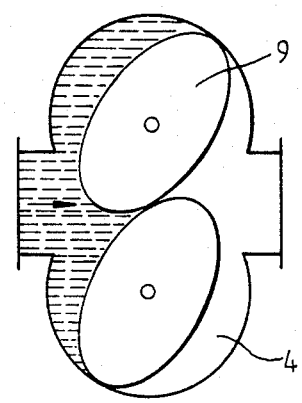
Figure 5:
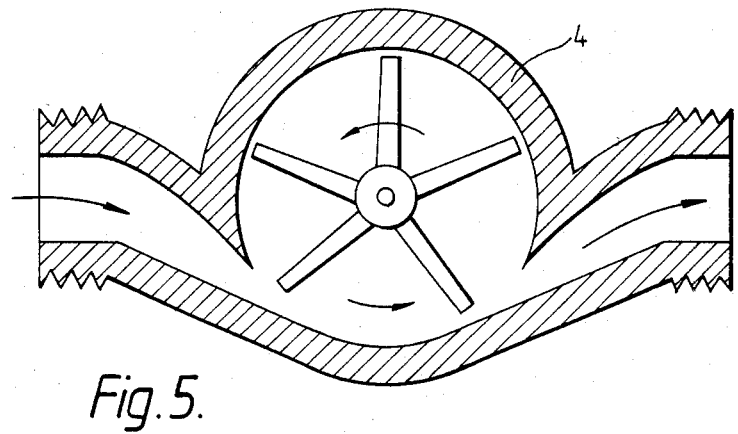
Figure 6:
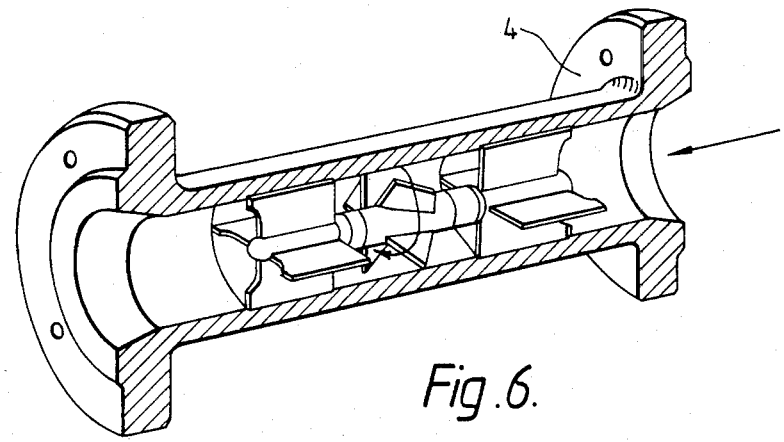

FIG. 2 presents another application of the installation of a means according to the invention, FIG. 3 displays schematically the means of the invention, and FIGS. 4–6 display various meters which may be used in a means according to the invention.

The means of the invention (FIG. 3) has a frame unit 1, which may consist e.g. of transparent plastic and which contains a bore 2. The bore 2 branches off into several branches, each such branch being connected to one meter 4. From each meter 4, a pipe 6 fitted with a valve 5 carries further to one bearing 7 that has to be lubricated. (For the sake of perspicuity, in FIG. 3 only one conduit 6 departing from a meter has been shown.) Each meter 4 has been connected with a different bearing. From the bearing 7 goes further an exit pipe 8, by the aid of which the oil used in lubrication is conducted further as desired in the oil circulation. It is possible to combine for instance 2 to 12 meters 4 in one frame 1 operating as distribution header. From each meter is derived a signal proportional to the flow rate, and this may be transferred e.g. electrically to a point which is convenient in view of supervision. (The electrical connections are not shown in the drawings.)

It is possible to use for meters 4 any type of measuring apparatus appropriate for volumetric measuring. Most appropriate is the oval gear meter depicted in FIG. 4, where the flowing liquid rotates two ovally shaped gears 9. The number of revolutions of the gears is proportional to the liquid quantity that has passed through the meter. It is possible to use instead of the oval gear meter, also e.g. the turbine meter shown in FIG. 5, or the jet meter of FIG. 6, or another equivalent meter. These meters are known in the art in themselves and therefore their construction and mode of operation have not been more closely described in this connection.

In FIG. 1 is shown the installation of the means of the invention in conjunction with the multiple cylinder drier of a paper machine. The drier comprises drying cylinders 10, against which the paper web 11 is urged with the aid of felts 12. The drier comprises a great number of cylinders 12 and guide rolls 13, all of them fitted with oil-lubricated bearings 7. The means 14 of the invention has been installed as close as possible to the bearings, and distribution of oil to the bearings is accomplished with the aid of the means. While the means of the invention serves as branch-off system for the piping, it also at the same time meters the oil quantity going to the bearing.

FIG. 2 illustrates the installation of the means of the invention 14 between cylinders 10.

The number of distribution units according to the invention needed in a paper machine totals about 100, depending on the number of branches on the units and on the number of bearings in the paper machine.

The invention is not confined to the application above presented: it may vary in many ways within the scope of the claims. It may be applied not only on paper machines but equally in any kind of apparatus having a great number of oil-lubricated bearings, for instance in lubricating the bearings of propeller shafts in ships, or in rolling mills in the steel industry, etc. It is also usable in metering viscous lubricants.

I claim:

1. A method for lubricating the bearings in equipment having a plurality of lubricated bearings, comprising:

locating a distribution header comprising, on a common frame, (i) a plurality of volumetric meters, (ii) a common supply conduit, (iii) branch conduits connecting the supply conduit to the individual volumetric meters, and (iv) valved outlets leading from the individual volumetric meters, adjacent selected ones of the bearings to be lubricated;

connecting the valved outlets from the individual volumetric meters, through connecting conduits, respectively to individual bearings of those selected;

supplying lubricant to the common supply conduit, thereby to distribute the lubricant to the selected bearings through the individual volumetric meters and valved outlets respectively associated therewith;

generating electrical signals respectively proportional to the lubricant flow passing through each of the volumetric meters;

transferring those electrical signals to a convenient monitoring point whose location is independent of the location of the distribution header and its plurality of volumetric meters; and controlling the quantity of lubricant distributed to the individual bearings in response to the signals at the monitoring point.

2. An apparatus for carrying out the method of claim 1 wherein the individual volumetric meters are of the type selected from the group consisting of gear, turbine or jet meters and wherein between two and twelve individual such meters are disposed within a single frame unit.

* * * * *